2 Sheets, Sheet 1.

D. R. Read,

Bee Hive.

No. 113,928. Patented Apr. 18, 1871.

Witnesses.                                   Inventor.
M. W. Stypes,                        Dwight Ripley Read,
Annulus Shrub                 By Samuel Jacob Wallace,
                                              Attorney.

D. R. Read,
Bee Hive.
No. 113,928. Patented Apr. 18, 1871.

Witnesses.
M. W. Stypes,
Annelin Ariel

Inventor.
Dwight Ripley Read
By Samuel Jacob Wallace
Attorney.

United States Patent Office.

DWIGHT RIPLEY READ, OF LAWRENCE, KANSAS.

Letters Patent No. 113,928, dated April 18, 1871.

IMPROVEMENT IN BEE-HIVES.

The Schedule referred to in these Letters Patent and making part of the same.

*To all whom it may concern:*

I, DWIGHT RIPLEY READ, of Lawrence, Kansas, have made a new and useful Improvement in Bee-Hives, of which the following is a specification.

This invention consists of a bee-hive of simple practical form, with its parts made and arranged to suit best economy of bee-keeping, and substantially as set forth herein, using letters of reference to the several parts, as shown in the drawing.

The scale of drawing is one-fourth size. The sizes and proportions may be varied, but are given as preferred to scale, and the body of the hive is of regular quadrangular form, of wood.

A is the side walls;

B B, the frames for comb; and

C, the honey-boxes.

To secure the benefit of the vital heat of the hive to assist in starting work in the honey-boxes C, and to avoid the trouble to the loaded bees in bringing in honey to store in the boxes in passing up through the crowded mass in the center of hive, the boxes C are placed in the body of the hive, at one end, as shown, instead of outside, on top, as is usual; and to obviate the loss and difficulty of weak swarms in heating up large vacant hives the division-board E is used, to place across the hive at any point to suit the size of swarm, filling the inclosed space with frames B B at suitable distances; the size of the space to be enlarged as the colony gets larger.

To prevent this division-board E from being glued to the sides too strongly it is made rather smaller than the cross-section of hive, and has strips of tin fastened around to project and fill the edges to the walls.

Figure 1:
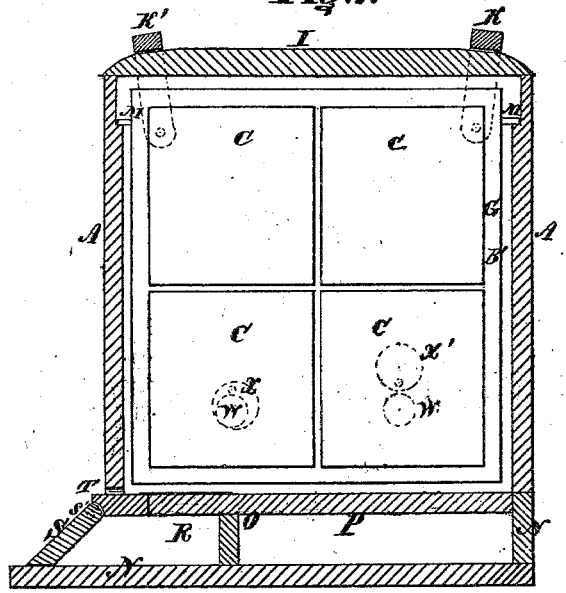
Figure 1 is a vertical section of end of hive.
Figure 2:
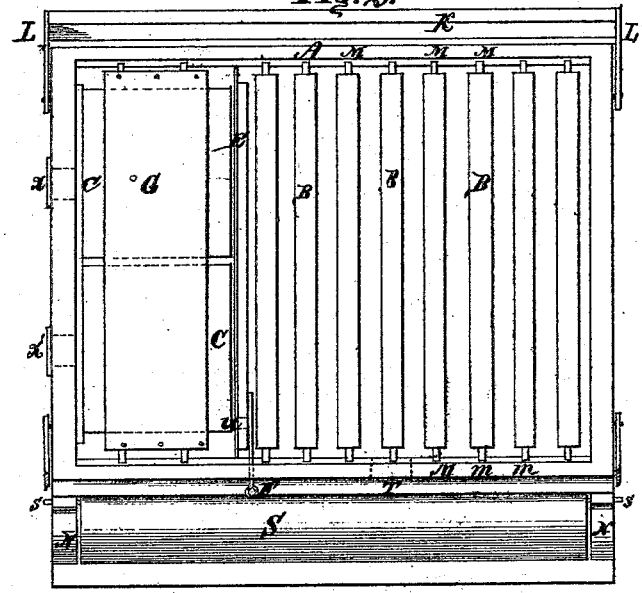
Figure 2 is a top view of hive with the cover removed.
Figure 3:
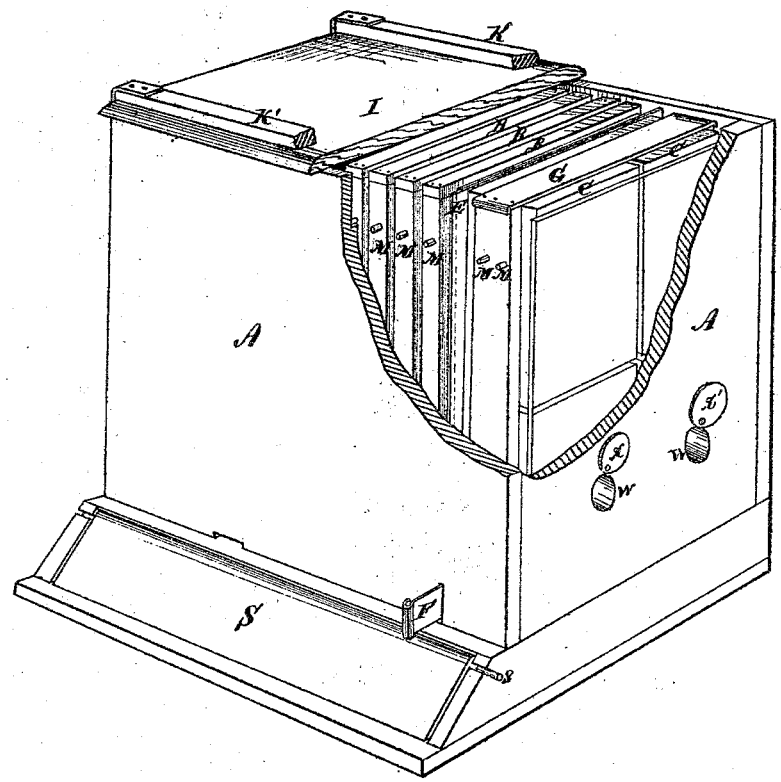
Figure 3 is a view in perspective, with a portion of top, side, and end removed.

The position of this board in fig. 2 is that of the full hive, and the space beyond it is that for the boxes C. This is kept closed, except at the period for filling the boxes.

At the bottom of E is a passage-space, F, from the hive to the boxes. This is kept closed by a strip of tin slid through a thin saw-slit from the outside, and removed when desired to be open.

The boxes C are of any suitable size and shape, and either one, two, three, or four in number.

They are hung in frames G, by which they are set in or removed readily, without disturbing the general hive.

For this purpose the top board is made in two parts, H and I, so that either may be removed separately to uncover the box space or that of the brood.

The top is not fastened by either nails or screws, which disturb the bees by removing, but by clamps K K', which are pivoted by the depending parts L L' at their ends to the outside ends of hive, at some distance down, so as to turn readily on or off the beveled edges of the top board to hold them firmly to the hive.

The frames B B are of suitable formation, and are hung loosely in the hive, so as not to touch the top, bottom, or sides, and are held by screws near their tops, at M M', which project so as to set with their heads on a step-offset in the side walls, being screwed into the frames.

The frame G is broad, for holding the boxes C, and held in the same way by a screw at each edge on both sides.

The box part of hive is made without a bottom. It sets upon a base, N. This base has a bottom, side walls two or three inches high, and a top, which covers a space corresponding in size to the space occupied by the bottom of the boxes C. The side walls of the base N fit closely to those of the top part.

This base N has a partition, O, separating an internal open space, P, for feeding, and a space, R, which has a wire screen over it for separation and ventilation.

This space R serves as a moth-trap, where moth-bait and poison are placed.

It has a door, S, in front, which is removable, and is supported at the upper edges of the ends S' S" by pivots, which serve for the door to swing on to partly raise it for the admission of moths, millers, and air.

The bees are admitted by an opening, T, in front, at the bottom, over the wire-screen part, and there is also another opening at U for entrance to the boxes C.

The boxes C have glass ends, which rest against the end of hive.

Through this are holes W W' for seeing when the boxes are full.

Over these holes tin parts X X are pivoted, to turn for closing.

I claim—

A bee-hive constructed substantially as described—that is to say, the box A, having cover H I, the clamps K K', base N with partition O, spaces R P, and door S, comb-frames B with screws M M', division-board E, frame G, and honey-boxes C, all arranged relatively one to the other, as and for the purpose set forth.

DWIGHT RIPLEY READ.

Witnesses:
SAMUEL JACOB WALLACE,
ADOLPH RINKER.